United States Patent
Yorita et al.

(10) Patent No.: US 7,313,949 B2
(45) Date of Patent: Jan. 1, 2008

(54) COMBUSTION CHAMBER PRESSURE SENSOR EQUIPPED WITH DAMPER BODY FOR ATTENUATING TRANSMITTED ENGINE VIBRATION

(75) Inventors: Hiroshi Yorita, Aichi-ken (JP); Tetsuya Miwa, Nagoya (JP); Hiromi Hiramatsu, Kariya (JP)

(73) Assignees: Denso Corporation (JP); Nippon Soken, Inc. (JP)

( * ) Notice: Subject to any disclaimer, the term of this patent is extended or adjusted under 35 U.S.C. 154(b) by 0 days.

(21) Appl. No.: 11/264,153

(22) Filed: Nov. 2, 2005

(65) Prior Publication Data

US 2006/0090544 A1    May 4, 2006

(30) Foreign Application Priority Data

Nov. 2, 2004    (JP)    ............................. 2004-319735

(51) Int. Cl.
G01M 15/00    (2006.01)
(52) U.S. Cl. ........................................................ 73/115
(58) Field of Classification Search ................. 73/112, 73/115, 116, 117.2, 117.3, 118.1, 119 R, 73/120
See application file for complete search history.

(56) References Cited

U.S. PATENT DOCUMENTS

| | | | | |
|---|---|---|---|---|
| 5,101,659 | A * | 4/1992 | Takeuchi ...................... | 73/115 |
| 6,122,971 | A * | 9/2000 | Wlodarczyk .................. | 73/705 |
| 6,439,055 | B1 * | 8/2002 | Maron et al. .................. | 73/705 |
| 6,466,876 | B1 | 10/2002 | Brochan et al. | |
| 6,756,722 | B2 * | 6/2004 | Hiramatsu ................... | 313/144 |
| 6,813,952 | B2 * | 11/2004 | Yamashita et al. ............ | 73/708 |
| 6,880,391 | B2 * | 4/2005 | Matsuyama et al. .......... | 73/115 |
| 6,923,042 | B2 * | 8/2005 | Hiramatsu ................... | 73/35.12 |
| 7,159,448 | B2 * | 1/2007 | Moelkner et al. ........... | 73/35.12 |
| 2002/0195917 | A1 * | 12/2002 | Hiramatsu ................... | 313/144 |
| 2004/0182144 | A1 * | 9/2004 | Okazaki et al. ............. | 73/118.1 |
| 2005/0034525 | A1 * | 2/2005 | Moelkner et al. ............. | 73/715 |
| 2005/0045167 | A1 * | 3/2005 | Mizutani et al. ............ | 123/634 |
| 2005/0150301 | A1 * | 7/2005 | Skinner et al. ............... | 73/714 |
| 2005/0284454 | A1 * | 12/2005 | Iwami et al. ............... | 123/635 |

FOREIGN PATENT DOCUMENTS

| | | |
|---|---|---|
| DE | 3731651 | 3/1988 |
| DE | 19802487 | 7/1999 |

(Continued)

OTHER PUBLICATIONS

German Office Action dated May 30, 2007 issued in counterpart German Application No. 10 2005 051 775.7-52 with English translation.

*Primary Examiner*—Eric S. McCall
(74) *Attorney, Agent, or Firm*—Nixon & Vanderhye PC

(57) ABSTRACT

A combustion chamber pressure sensor for an internal combustion engine includes an elongated pressure transmitting member having one end exposed to the interior of an engine cylinder and the opposite end contacting a pressure sensing element which generates a pressure measurement signal, the pressure transmitting member and pressure sensing element being contained within an elongated housing. A damping body formed of a viscoelastic material is disposed on an outer or inner circumferential surface of the housing, for reducing an amount of engine vibration that is transmitted to the pressure sensing element and thereby reducing noise in the pressure measurement signal.

18 Claims, 14 Drawing Sheets

FOREIGN PATENT DOCUMENTS

| | | |
|---|---|---|
| DE | 10346296 | 4/2004 |
| GB | 1116581 | 6/1968 |
| GB | 2196425 | 4/1988 |
| JP | 2000-277232 | 10/2000 |
| JP | 2004-349133 | 12/2004 |

* cited by examiner

COMBUSTION CHAMBER PRESSURE SENSOR EQUIPPED WITH DAMPER BODY FOR ATTENUATING TRANSMITTED ENGINE VIBRATION

This application is based on and incorporates herein by reference Japanese Patent Application No. 2004-319735 filed on Nov. 2, 2004.

BACKGROUND OF THE INVENTION

1. Field of Application

The present invention relates to a pressure sensor for measuring the pressure within a combustion chamber of an internal combustion engine.

2. Description of Related Art

By measuring the pressure within a combustion chamber of an internal combustion engine, it becomes for example possible to detect occurrence of engine knock, thereby enabling the engine operation to be more closely controlled. A combustion chamber pressure sensor which is utilized for such a pressure measurement function may be an independent device, or may be integrated with another device that is installed in a combustion chamber. A combustion chamber pressure sensor may for example be integrally combined with an engine spark plug, or with a combined ignition coil and spark plug. This is described for example in Japanese patent publication No. 2000-277232. However a basic problem exists with prior art subjected to the pressure of the combustion chamber and generates a pressure measurement signal accordingly. In the prior art, a substantial level of engine vibration is transmitted through the engine block and reaches the pressure sensing element, and results in occurrence of noise in the pressure measurement signal. This noise results in lowering of the pressure measurement accuracy. In particular, the existence of such noise renders it difficult to accurately detect the occurrence of engine knock, by monitoring pulsations in the pressure measurement signal.

SUMMARY OF THE INVENTION

It is an objective of the present invention to provide an improved combustion chamber pressure sensor which overcomes the above problems of the prior art.

To achieve this objective, according to a first aspect, the invention provides a combustion chamber pressure sensor for measuring pressure within a combustion chamber that is enclosed in an engine block of an internal combustion engine, the pressure sensor comprising a housing that is attached in the engine block, with a front end of the housing being open to the interior of the combustion chamber and with a pressure sensing element being retained within the housing. A pressure transmitting member is retained within the housing, with its front end located in the front end of the housing and exposed to the interior of the combustion chamber, while the rear end of the pressure transmitting member is in contact with the pressure sensing element. Such a combustion chamber pressure sensor is characterized in that a damping body is disposed on the housing, for attenuating vibration that is transmitted to the housing from the engine block.

As a result of providing the damping body, vibration (caused by running of the engine) that is transmitted to the housing from the engine block is effectively attenuated, thereby reducing the level of such vibration that is transmitted to the pressure sensing element directly from the housing, or that is transmitted from the housing to the pressure transmitting member and so to the pressure sensing element. The level of noise resulting from such vibration, contained in a pressure measurement signal that is generated by the pressure sensing element, can thereby be substantially reduced by comparison with the prior art, and the pressure sensing accuracy can be accordingly increased.

The damping body is disposed on the housing without being in contact with to the pressure sensing element or the pressure transmitting member. It is thereby ensured that pressure variations that occur within the combustion chamber are transmitted to the pressure sensing element without being attenuated by the damping body, so that no deterioration of the pressure sensing accuracy can occur due to such attenuation.

The damping body may be disposed in contact with an external or an external circumferential surface of the housing. A large amount of surface area of the housing can thereby be held in direct contact with the damping body, so that effective attenuation of vibration can be achieved.

The damping body is preferably formed of a viscoelastic material that has a larger modulus of viscosity and a smaller modulus of elasticity than those of the material which constitutes the housing of the combustion chamber pressure sensor, to ensure effective vibration attenuation.

Specifically, the modulus of viscosity of the damping body is preferably at least $10^2$ PaS, and the modulus of elasticity of the damping body is preferably no greater than $3 \times 10^{10}$ N/m$^2$. If the modulus of viscosity of the damping body is less than $10^2$ PaS, then there will be an insufficient degree of absorption of the vibration by the damping body, while if the modulus of elasticity exceeds $3 \times 10^{10}$ N/m$^2$ then effective attenuation of vibration at frequencies that are lower than 6 kHz cannot be achieved.

The damping body may be advantageously formed from a synthetic plastic material such as polyphenylene sulfide, phenol, epoxy, alkyd, and polyester. Alternatively, the damping body may be advantageously formed from silicon rubber or fluorine rubber. Each of these materials are viscoelastic, i.e., having both viscosity and elasticity. Such a material is readily deformed by an applied force, but only gradually recovers its original shape after the applied force is removed. These characteristics ensure effective damping operation. In that case, the damping body may be formed as a separate member, before being mounted on the combustion chamber pressure sensor, or may consist of a deposited layer of a viscoelastic material, formed on an external circumference surface or an internal circumference surface (or both of these surfaces) of the housing.

Alternatively, the damping body may be constituted by a liquid which has high viscosity, such as silicon oil. In that case the housing of the combustion chamber pressure sensor is formed to incorporate an enclosed chamber serving as a damper housing, which is filled with such a viscous liquid. The viscosity of the liquid is preferably at least $10^{-3}$ PaS while, from considerations of ease of filling the enclosed chamber with the viscous liquid, the viscosity should be no greater than 4 PaS.

According to another aspect, a combustion chamber pressure sensor according to the present invention can be integrally formed in a combination ignition coil, spark plug and pressure sensor. The ignition coil and spark plug components of such a combination device include a primary coil and secondary coil of the ignition coil, a central electrode, a ground electrode, and an insulator that is of elongated tubular form and encloses the secondary coil and the central electrode and is enclosed by the primary coil. The primary coil is sheathed in the housing, and the ground electrode is attached to the front end of the housing, with a front end of the insulator being disposed adjacent to the ground electrode, exposed to the interior of the combustion chamber. The tip of the rear end of the insulator is disposed in contact with the pressure sensing element, such that the pressure sensing element is held between that rear end of the insulator and a retaining member at the rear end of the housing. Thus the insulator (in addition to its electrical insulation function) performs the function of the aforementioned pressure transmitting member of the combustion chamber pressure sensor. The housing of the combination spark plug and pressure sensor is provided with a damping body as described above, so that the advantage of increased accuracy of the pressure measurement signal can also be obtained with such a combination spark plug and pressure sensor.

In that case, the primary coil of the ignition coil may be potted in a synthetic plastic material that is viscoelastic, such as epoxy resin, molded to form a tubular member. That tubular member can be disposed within the housing, enclosing the insulator, with the outer circumferential surface of the tubular member in contact with the internal circumferential surface of the housing, and with a gap between the inner circumferential surface of the tubular member and the outer circumferential surface of the insulator. The tubular body containing the primary coil thereby serves as an effective damping body.

Alternatively, a combustion chamber pressure sensor according to the present invention can be integrally formed in a combination glow plug and pressure sensor, i.e., for use when the internal combustion engine is a diesel engine. The glow plug components of such a combination device include a heater and an axially centrally disposed conductor element for supplying electrical power to the heater. The conductor element is of elongated form and retained within the housing, extending along a central axis of the housing, while the heater is fixedly attached to a front end of the conductor element, and is exposed to the interior of the combustion chamber. The tip of the rear end of the conductor element is disposed in contact with the pressure sensing element, such that the pressure sensing element is held between that rear end of the conductor element and a retaining member at the rear end of the housing. Hence in this case, the pressure transmitting member of the combustion chamber pressure sensor is constituted by the heater element and the conductor element, in combination.

The housing of the combination glow plug and pressure sensor is provided with a damping body as described above, so that the advantage of increased accuracy of the pressure measurement signal can also be obtained with such a combination glow plug and pressure sensor.

DESCRIPTION OF PREFERRED EMBODIMENTS

First Embodiment

Figure 1:
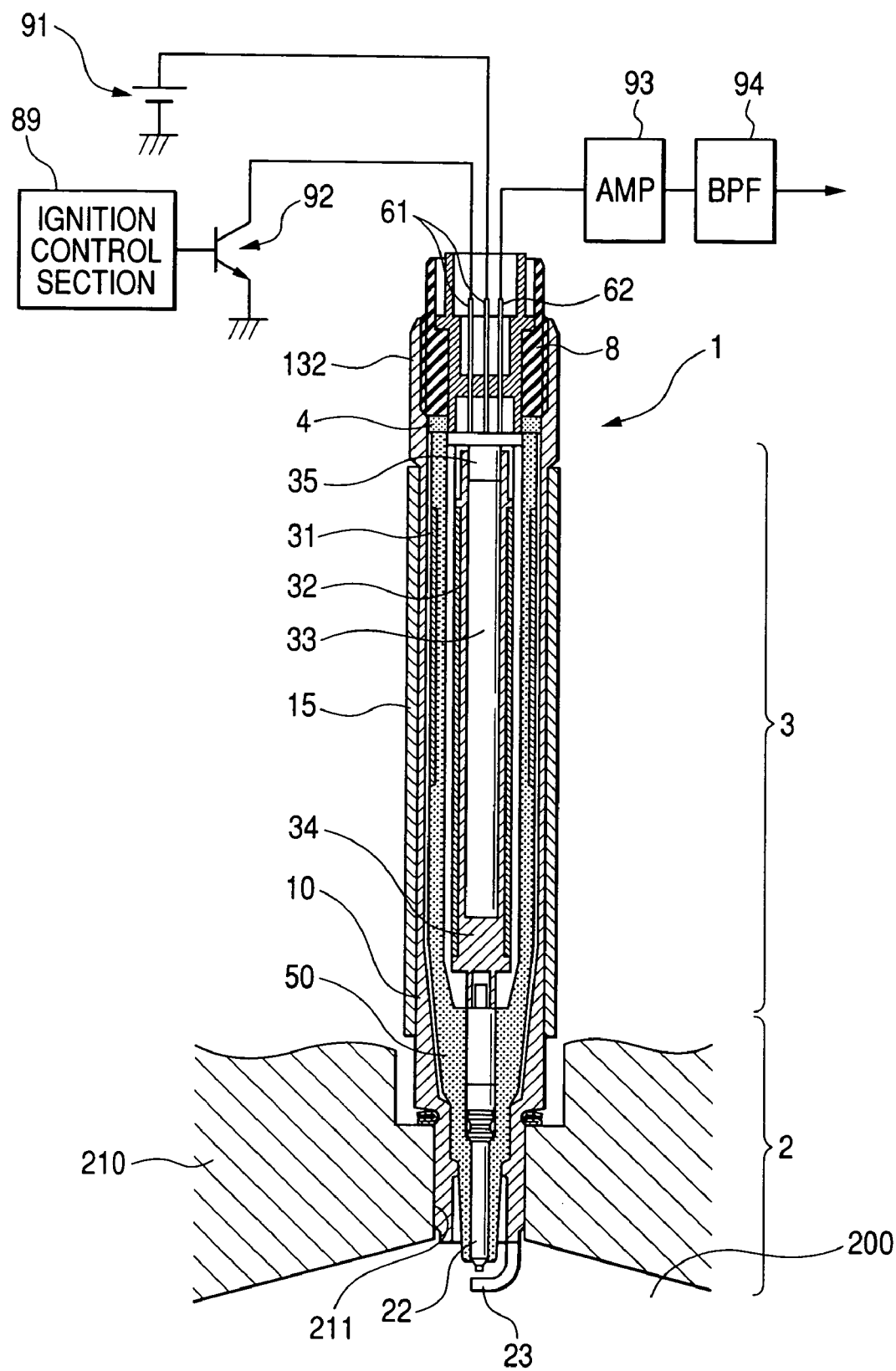
FIG. 1 is a cross-sectional view of a first embodiment of a combustion chamber pressure sensor, which is integrated with an ignition coil and a spark plug.

A first embodiment will be described referring to FIGS. 1 to 7. As shown in cross-sectional view in FIG. 1, this embodiment is a combustion chamber pressure sensor that is integrally combined with an ignition coil and spark plug. The combination device, designated by reference numeral 1 in FIG. 1, will be referred to in the following simply as a combination spark plug and sensor. The combination spark plug and sensor 1 includes a housing 10 that is fixedly attached in an engine block 210 of an internal combustion engine (only a part of the engine block 210 of that internal combustion engine being shown in FIG. 1), with the engine block 210 enclosing a combustion chamber 200. A pressure sensing element 4, which is of annular shape, is retained within the housing 10, with opposing annular faces of the pressure sensing element oriented at right angles to a central axis of the combination spark plug and sensor 1. An insulator 50, in addition to performing an electrical insulation function, also serves as a pressure transmission member, for transmitting the pressure within the combustion chamber 200 to the pressure sensing element 4. The combination spark plug and sensor 1 is of basically cylindrical shape, elongated along the aforementioned central axis. For clarity of description in the following, the end of the combination spark plug and sensor 1 that is the lowermost as seen in FIG. 1 will be referred to as the front end, while the end that is uppermost as seen in FIG. 1 will be referred to as the rear end. These "front" and "rear" designations will also be applied to components of the combination spark plug and sensor 1 that are elongated along its central axis. The insulator 50 is retained within the housing 10, with a portion of the front end of the insulator 50 protruding into the combustion chamber 200, exposed to the pressure within the combustion chamber 200. The pressure sensing element 4 is in contact with the insulator 50, at the tip of the rear end of the insulator 50. A damping body 15 disposed in contact with the outer circumference of the housing 10 serves to attenuate vibration that is transmitted from the engine block 210 to the housing 10.

As indicated in FIG. 1, the combination spark plug and sensor 1 is an integral combination of a spark plug 2 and an ignition coil 3. The ignition coil 3 includes a primary coil 31 and a secondary coil 32, while the spark plug 2 includes a center electrode 22 and a ground electrode 23. The insulator 50 is of tubular shape, and surrounds the primary coil 31, and is enclosed within the housing 10. The housing 10 is formed of an electrically conducting material, and the tip of its front end has the ground electrode 23 fixedly attached and electrically connected thereto, protruding into the combustion chamber 200.

It can thus be understood that the combination spark plug and sensor 1 is disposed with the front end thereof inserted into the combustion chamber 200 and the rear end thereof disposed external to the combustion chamber 200.

A retaining member 8, which determines a limit position of the insulator 50 along the axial direction of the combination spark plug and sensor 1, is attached by being screwed into the rear end of the housing 10. The pressure sensing element 4 is held in position between the front end of the retaining member 8 and an annular face at the rear end of the insulator 50. A major part of the external circumferential surface of the housing 10 is sheathed in the damping body 15, which of elongated tubular form.

The combination spark plug and sensor 1 is configured to be attached to the internal combustion engine by being screwed into a plug hole 211 that is formed in the engine block 210, with the center electrode 22 and ground electrode 23 that constitute the spark plug 2 being thereby exposed to the interior of the combustion chamber 200.

Figure 2:
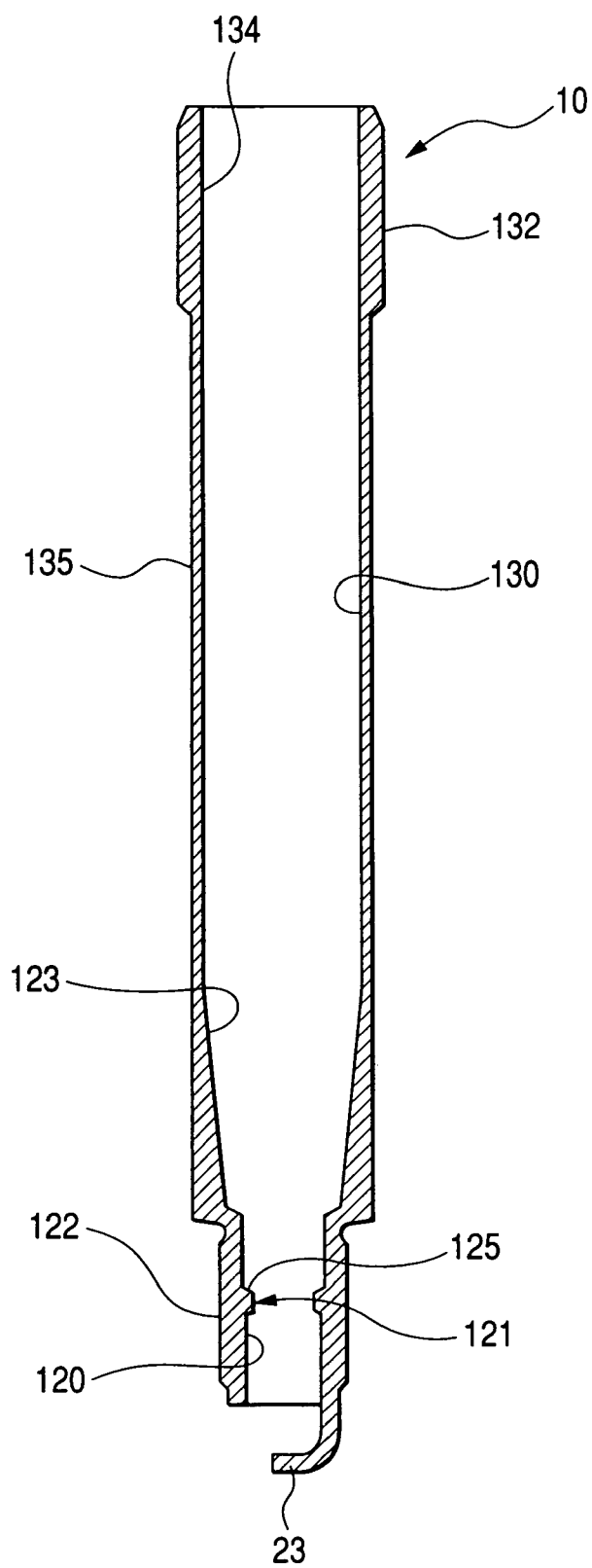
FIG. 2 is a cross-sectional view of a housing in the first embodiment.

As shown in FIG. 2, the housing 10 is of basically elongated tubular form, having a central cylindrical through-hole which is a combination of a coil accommodation section 130 that accommodates the ignition coil 3 and a spark plug accommodation section 120 which is of smaller diameter than the coil accommodation section 130 and which accommodates the spark plug 2. In addition, the housing 10 is formed with a portion having an inner circumferential tapered face 123, that extends between the front end of the coil accommodation section 130 and the rear end of the spark plug accommodation section 120, i.e., with the diameter of the tapered face 123 decreasing from rear to front, along the axial direction.

In the ignition coil 3 and spark plug 2, the insulator 50 is formed of a ceramic material such as alumina, while remaining components (other than the primary coil and secondary coil) are formed of steel, i.e., are electrically conductive.

Also as shown in FIG. 2, the inner circumferential face of the spark plug accommodation section 120 is formed with a stepped portion 121, which is of smaller diameter than other portions of that inner circumferential face. In that step portion 121, a rear face portion 125, which is oriented towards the coil accommodation section 130, is shaped to constitute an annular shelf, which contacts a correspondingly shaped face portion 523 of the insulator 50 (shown in FIG. 3) as described hereinafter.

Figure 6:
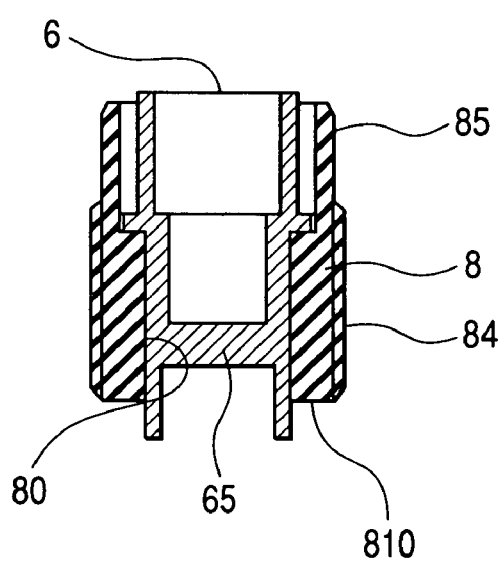
FIG. 6 is a cross-sectional view showing a combination of a support member and a connector, in the first embodiment.

A portion 134 of the inner circumferential face of the housing 10, that extends from the rear end of the housing 10, is formed with an internal screw thread for engaging with an external screw thread of the retaining member 8, as shown in FIG. 6 and described hereinafter.

Also as shown in FIG. 2, the outer diameter of the portion of the housing 10 that forms the coil accommodation section 130 is larger than the outer diameter of the portion of the housing 10 that forms the spark plug accommodation section 120. An external screw thread section 122 is formed in the outer circumference of the spark plug accommodation section 120, and of the housing 10, while a nut portion 132 (shaped to engage with an appropriate tool such as a spanner) is formed in a part of the outer circumferential face of the housing 10 that extends from the rear end of the housing 10. The housing 10 can thereby be rotated about its central axis, by engaging an appropriate tool with the nut portion 132, so that when the external screw thread section 122 is engaged with the internal screw thread in the plug hole 211, the housing 10 can be screwed into the plug hole 211 and the combination spark plug and sensor 1 thereby attached to the engine block 210.

A central portion 135 of the outer circumferential surface of the housing 10 is sheathed in the damping body 15, as described hereinafter. The ground electrode 23 is welded to the tip of the external screw thread section 122, being disposed with a predetermined separation from the tip of the front end of the center electrode 22.

Figure 3:
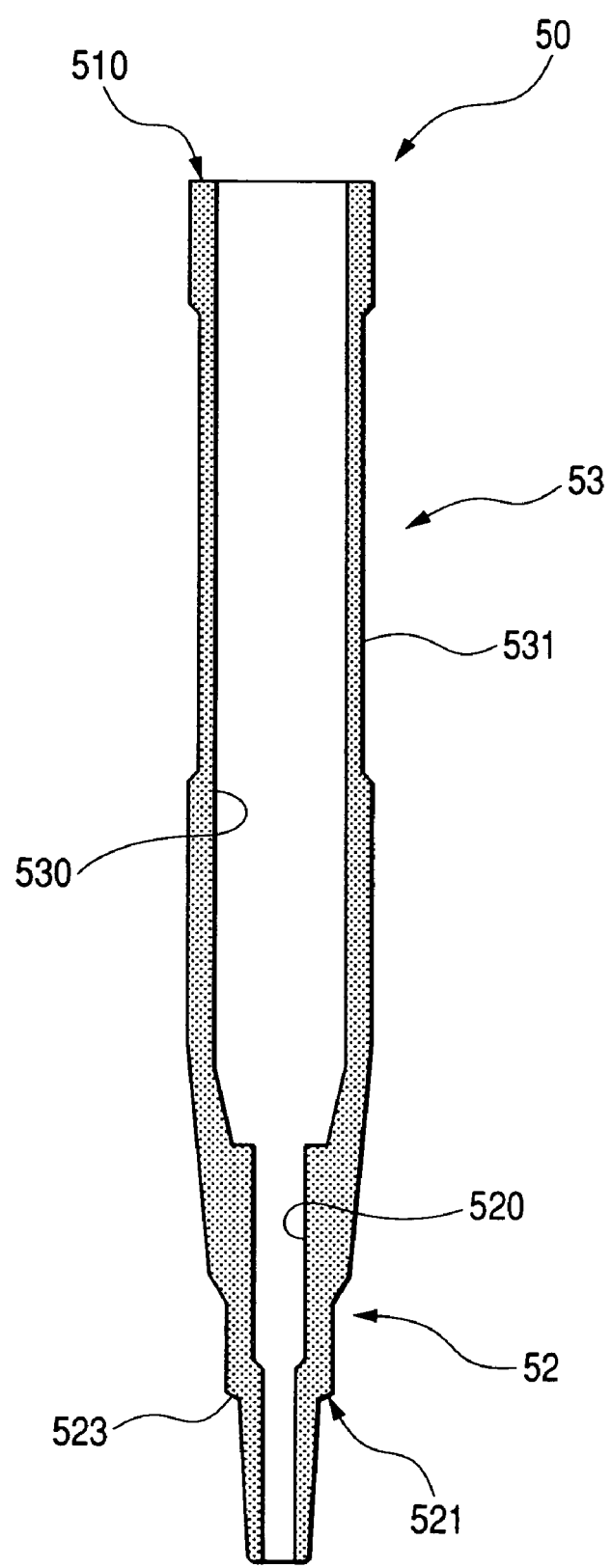
FIG. 3 is a cross-sectional view of an insulator in the first embodiment.

As shown in FIG. 3, the insulator 50 is made up of a plug-side tubular portion 52 which is accommodated within the spark plug accommodation section 120 of the housing 10 and constitutes part of the spark plug 2, and a coil-side tubular section 53 which is accommodated within the coil accommodation section 130 of the housing 10 and which constitutes part of the ignition coil 3.

Also as shown in FIG. 3, the outer circumferential face of the plug-side tubular section 52 is formed with a stepped portion 521 (i.e., located at the opposite end of the insulator 50 from the coil-side tubular section 53), constituting a stepwise decrease in the outer diameter of the plug-side tubular section 52. When the insulator 50 is inserted into the housing 10 (i.e., moving axially downward as seen in the drawings), the face 523 of the step portion 521 abuts against the receiving face 125 of the step portion 121 of the housing 10 (shown in FIG. 2).

The axial insertion position of the insulator 50 within the housing 10 is thereby limited by contact between these faces 125 and 523. When these faces are in contact, the tip of the plug-side tubular section 52 of the insulator 50 protrudes outward from the tip of the front end of the housing 10, with the aforementioned predetermined spacing between that tip of the plug-side tubular section 52 and the ground electrode 23. In addition, due to the contact between the faces 125 and 523, effective hermetic sealing can be achieved between the housing 10 and the insulator 50.

A part of the circumferential face of the insulator 50 is formed with a coil mounting section 531, shown in FIG. 3, which is enclosed in the primary coil 31. The ends of the primary coil 31 are electrically connected via terminal pins 61 to external terminals. (not shown in the drawings), from which electrical power is supplied to the primary coil 31 from an external source as described hereinafter.

Referring again to FIG. 3, the aforementioned axially central through-hole of the insulator 50 is formed with an ignition coil hole section 530, within the coil-side tubular section 53, which is of larger diameter than the plug hole section 520.

The plug hole section 520 is shaped to accommodate a part of the spark plug 2 (as shown in FIG. 1), while the ignition coil hole section 530 is shaped to accommodate a part of the ignition coil 3.

Figure 4:
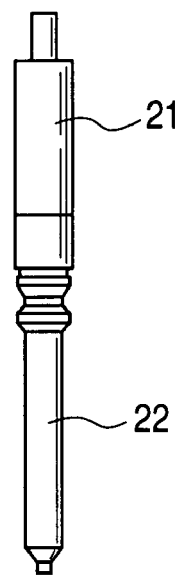
FIG. 4 is a cross-sectional view showing the central electrode and stem of the spark plug in the first embodiment.

Referring to FIGS. 1 and 4, the spark plug 2 is made up of the stem 21, the center electrode 22 and the ground electrode 23, each of which is formed of steel, i.e., an electrically conductive metal. The center electrode 22 and the stem 21 are accommodated within the plug hole section 520 of the insulator 50. The tip of the center electrode 22 is located at a predetermined spacing from the ground electrode 23, and is exposed to the interior of the combustion chamber 200 of the internal combustion engine.

As shown in FIG. 1, the ignition coil 3 is formed of a combination of the primary coil 31 (which is supplied with electrical power from the ignition power supply 91 and the ignition transistor 92 in combination), the secondary coil 32 (which is enclosed within the inner circumference of the primary coil 31), and the cylindrical-shaped central core 33 (which is enclosed within the inner circumference of the secondary coil 32). The ignition coil 3 is configured to generate a high voltage between the ends of the secondary coil 32, by electrical induction in accordance with the electrical power that is supplied to the primary coil 31.

The high-voltage terminal of the secondary coil 32 is electrically connected via the stem 21 to the center electrode 22 of the spark plug 2. The low-voltage terminal of the secondary coil 32 is electrically connected via a terminal (not shown in the drawings) to the housing 10. The housing 10 is grounded via the engine block 210, etc., to the body of the vehicle in which the internal combustion engine is installed.

As shown in FIG. 1, the primary coil 31 is wound on the coil mounting section 531 of the insulator 50. The primary coil 31 of this embodiment is formed of wire having a rectangular cross-sectional shape, having a layer of electrically insulating material formed thereon, and is configured as a single-layer winding on the outer circumference of the coil mounting section 531. With this embodiment, the primary coil 31 has been soaked in liquefied epoxy resin, which has hardened and thereby fixedly attached the primary coil 31 to the coil mounting section 531.

Also as shown in FIG. 1, the central core 33 is of tubular shape, and is formed of a flexible material. The central core 33 is configured to be accommodated within a cylindrical cavity 340 formed in a spool 34. The cylindrical cavity 340 extends along the axial direction, from the rear end of the spool 34. The spool 34 is enclosed within the secondary coil 32, i.e., has the secondary coil 32 wound thereon.

Figure 5:
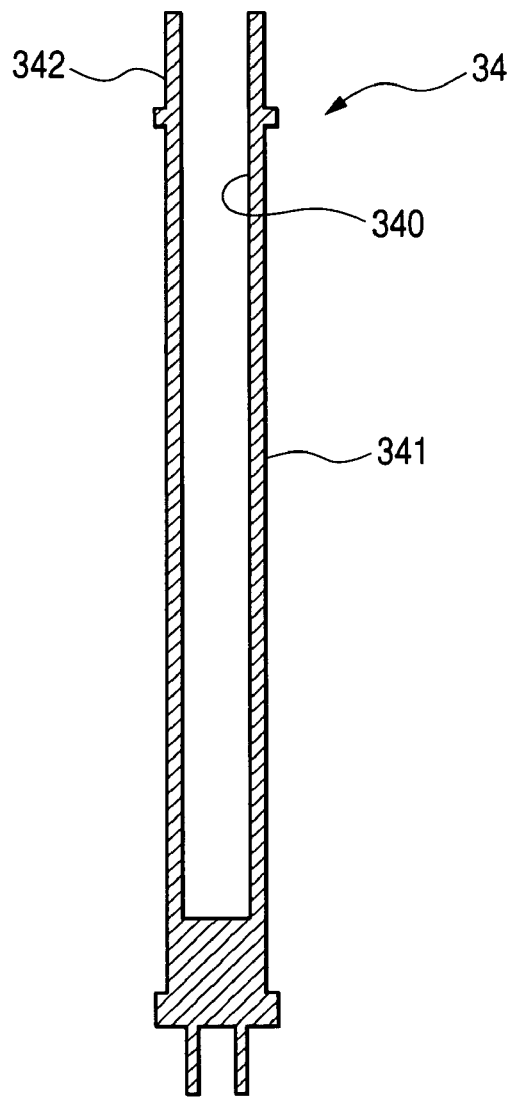
FIG. 5 is a cross-sectional view of a spool in the first embodiment.

Specifically, referring to FIG. 5, the spool 34 is formed of a coil accommodating tubular section 341 on which the secondary coil 32 is wound (as shown in FIG. 1), and a protruding tubular section 342 which extends from the coil accommodating tubular section 341 to the rear end of the spool 34.

The central core 33 is inserted within the axially extending central cavity 340 of the spool 34 (i.e., to reach the front end of the central cavity 340), with the central core 33 being shorter in length than the central cavity 340.

Also as can be seen from FIG. 1, with the central core 33 inserted in the central cavity 340, a remaining portion of the interior of the protruding tubular section 342 (i.e., the rear-end opening of that tubular section 341) is filled with a core plug 35, formed of an appropriate elastic material such as rubber or foam rubber.

The spool 34 is fixed within the ignition coil hole section 530 of the insulator 50 by means of an electrically insulating material, epoxy resin, which fills the ignition coil hole section 530. In that way, the high-voltage section of this embodiment, including the secondary coil 32, the stem 21 and center electrode 22, and also the low-voltage section which includes the primary coil 31 and the housing 10, are electrically insulated overall by the insulator 50. For that reason, the combination spark plug and sensor 1 of this embodiment has a high degree of electrical reliability, and excellent ignition performance.

Referring to FIGS. 1, 3 and 6, the pressure sensing element 4 is held between the rear end face 510 of the insulator 50 and the front face 810 of the retaining member 8. The retaining member 8 is of tubular form, having an axially extending through-hole 80, whose diameter is substantially identical to the inner diameter of the pressure sensing element 4. A connector 6 engages in the through-hole 80, as described hereinafter.

The part of the outer circumferential face of the retaining member 8 that is accommodated in the housing 10 is formed with an external screw thread portion 84, for engaging with the internal screw thread portion 134 in the housing 10, shown in FIG. 2.

The part of the outer circumferential face of the retaining member 8 that is not accommodated in the housing 10 (i.e., a rear exposed portion) is formed with a nut-head portion 85, for engaging with a tool such as a spanner (not shown in the drawings), to enable the retaining member 8 to be rotated for adjusting the axial position of the retaining member 8 in a front or rearward direction.

The front end of the retaining member has the aforementioned annular end face 810 formed thereon, and the pressure sensing element 4 is held between that end face 810 and the annular rear end face 510 of the insulator 50, so that an appropriate level of axially-directed load force can be applied to the pressure sensing element 4 by the retaining member 8, through the aforementioned adjustment of the axial position of the retaining member 8. Suitable pre-loading of the pressure sensing element 4 can thereby be established.

The front annular face of the pressure sensing element 4 (i.e., adjacent to the insulator 50) electrically contacts an annular-shaped terminal (not shown in the drawings), which is electrically connected to the terminal pin 62 shown in FIG. 1. The retaining member 8 is preferably formed of carbon steel, which is electrically conductive, and is screwed into the housing 10 which is also formed of electrically conductive material. A pressure measurement signal generated by the pressure sensing element 4 is thus outputted between the terminal pin 62 and the housing 10.

The pressure sensing element 4 is shaped as an annular thin plate, formed of lead titanate, and exhibits large changes in electrical resistance in accordance with the level of applied load (i.e., applied surface pressure). The annular shape of the pressure sensing element 4 is substantially identical to that of the aforementioned annular end face 510 of the insulator 50.

Changes in internal resistance of the pressure sensing element 4 are outputted as changes in potential between the housing 10 and the terminal pin 62, i.e., to constitute the pressure measurement signal.

The connector 6 is formed of a plastic material, of basically cylindrical shape, configured to engage in the through-hole 80 of the retaining member 8. As shown in FIG. 6, the connector 6 is formed with an internal partition 65 oriented at right angles to the central axis of the housing 10, that defines a rear recessed portion and front recessed portion of the connector 6, i.e., which are mutually separated by the partition 65.

The rear (i.e., outward) recessed portion accommodates a connector socket (not shown in the drawings), that can be linked (i.e., by plugging in a corresponding connector plug) to external equipment (an ignition transistor 92, ignition power supply 91, amplifier 93, shown in the upper part of FIG. 1). The partition 65 is formed with through-holes for retaining the terminal pin 62, which is electrically connected to the pressure sensing element 4, and the terminal pins 61, which are electrically connected to the primary coil 31, with the terminal pins 61 and terminal pins 62 passing through respective ones of these through-holes in the partition 65 and being connected to the aforementioned connector socket.

With this embodiment, the damping body 15 is a tubular member formed of polyolyphene plastic (a viscoelastic material), with a thickness of 0.3 mm, and is shaped to be somewhat larger in internal diameter than the external diameter of the center section 135 of the housing 10. In the process of manufacture, the damping body 15 is pulled over the center section 135, to cover that part of the housing 10, then is heated to a temperature of more than 90° C., to thereby shrink-fit the damping body 10 around the outer circumference of the housing 10, by thermal shrinkage. The damping body 10 is thereby held in close contact with a major part of the external circumferential surface area of the housing 10.

The operation of this embodiment is as follows. A high voltage is generated by the ignition coil 3, driven by the ignition transistor 92 (controlled from an ignition control section 89) and an ignition power supply 91. This high voltage is supplied to the spark plug 2, whereby an electric discharge occurs in the gap between the ground electrode 23 and the tip of the center electrode 22. A mixture of air and fuel vapor within the combustion chamber 200 is thereby ignited.

The pressure within the combustion chamber 200 is transmitted by the insulator 50 to the pressure sensing element 4, which thereby produces a pressure measurement signal in accordance with the pressure within the combustion chamber 200, with that signal being outputted via the terminal pin 62 to the amplifier 93. The pressure measurement signal is amplified by the amplifier 93 and the resultant signal is transferred through the band pass filter 94 for noise removal. With this embodiment, the band pass filter 94 has a passband from 6 kHz to 8 kHz.

Figure 7:
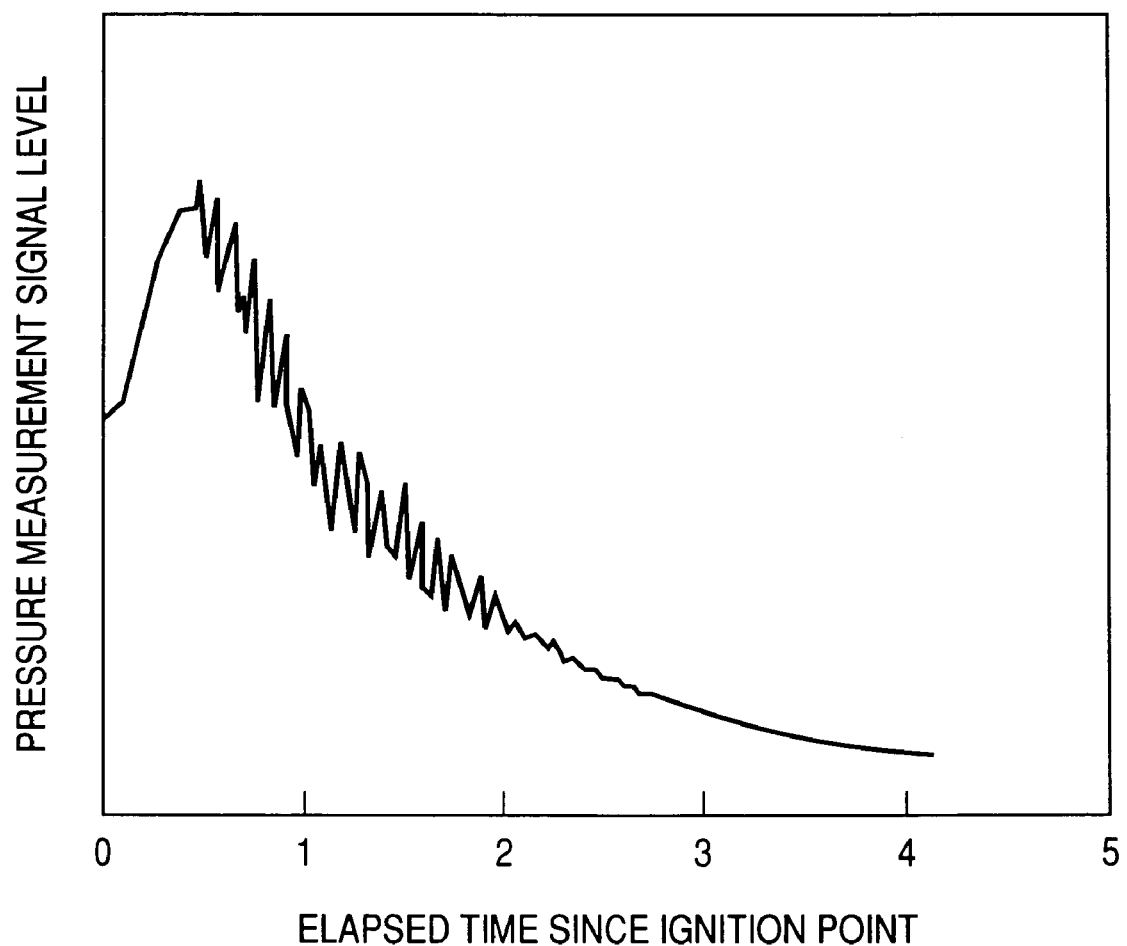
FIG. 7 is a graph illustrating the variation of a pressure measurement signal, with the first embodiment.

When engine knocking occurs in the internal combustion engine then as illustrated in the graph of FIG. 7, during an interval of duration approximately 0.5 msec to 2.5 msec which begins at approximately 0.5 msec after ignition, as the pressure in the combustion chamber 200 decreases from a peak value, the waveform of the pressure measurement signal contains a component at a frequency of approximately 7 kHz. This is the knocking frequency. The band pass filter 94 extracts this 7 kHz knocking frequency component from the pressure measurement signal, as a pressure variation component. In FIG. 7, time is plotted along the horizontal axis, with the point of ignition being the origin point, and the amplitude of the pressure measurement signal from the pressure sensing element 4 being plotted along the vertical axis. The signal values are normalized in FIG. 7 such that zero represents zero pressure.

With this embodiment as described above, the damping body 15 is disposed in direct contact with a major portion of the outer circumferential surface of the housing 10, so that the amount of engine vibration that is transmitted to the pressure sensing element 4 is substantially attenuated. Noise in the pressure measurement signal is thereby reduced, so that the accuracy of detecting engine knocking is increased. That is to say, while the internal combustion engine is being driven, with resultant vibration being transmitted directly from the engine block 210 to the front end of the housing 10 (which is screwed into the engine block 210), the damping body 15 disposed around the housing 10 serves to substantially absorb the vibration of the housing 10. Hence, the amount of noise that is present in the pressure measurement signal from the pressure sensing element 4, due to vibration that is transmitted from the housing 10 to the pressure sensing element 4, can be substantially reduced.

As shown in FIG. 1, the damping body 15 is contained within the housing 10, and is not in contact with the insulator 50 which serves as a pressure transmitting member with this embodiment, or with the pressure sensing element 4. For that reason, the pressure and pressure pulsations that are applied to the insulator 50 from the interior of the combustion chamber 200 are transmitted to the pressure sensing element 4 without being attenuated by the damping body 15, so that the pressure within the combustion chamber 200 can be accurately measured. Engine knocking can thereby be accurately detected.

The above embodiment has been described for use in the detection of engine knocking. However it would be equally possible to adapt the embodiment for detecting the pressure variations that result from combustion within the combustion chamber 200. In that case, the band pass filter 94 could be omitted. Also in that case too, vibration transmitted from the engine block 210 would be effectively attenuated by the action of the damping body 15, so that fluctuations in the pressure detection signal from the pressure sensing element 4 due to such vibration would be eliminated, making it unnecessary to perform averaging or smoothing processing of the pressure detection signal in order to remove noise that results from the vibration.

Second Embodiment

Figure 8:
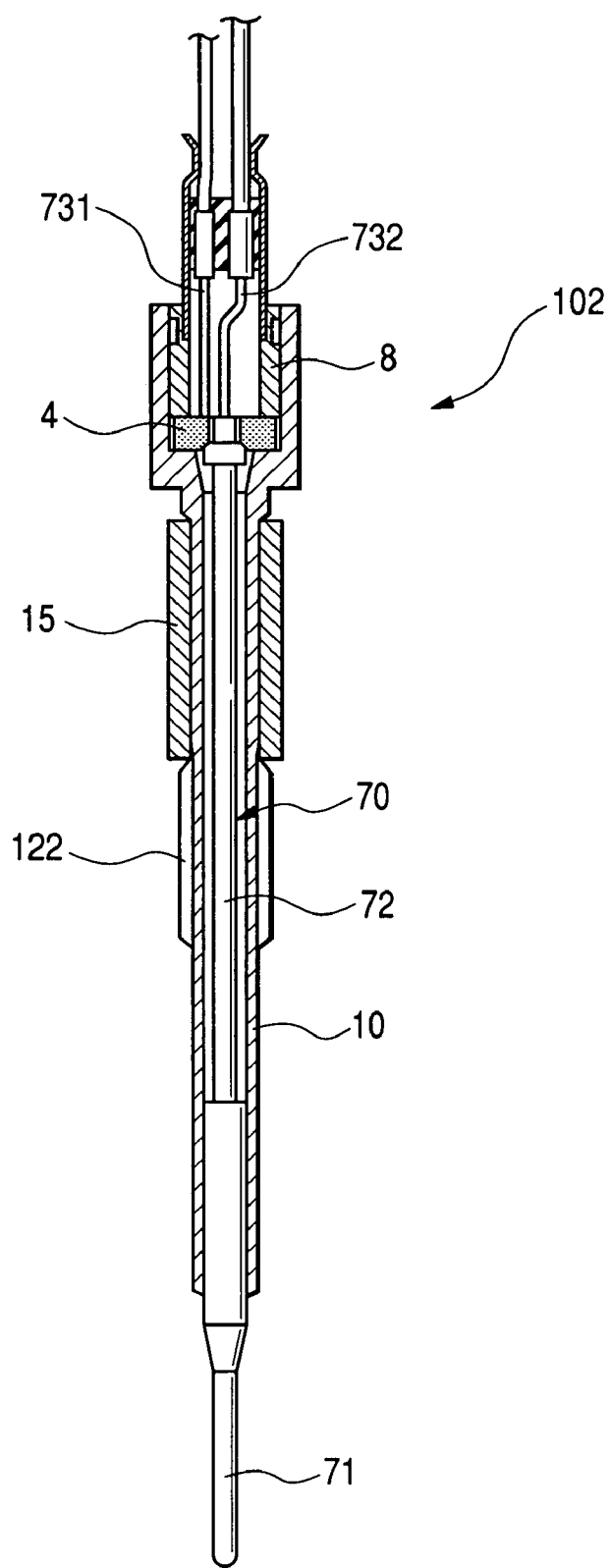
FIG. 8 is a cross-sectional view of a second embodiment of a combustion chamber pressure sensor, which is integrated with a glow plug.

FIG. 8 shows a second embodiment, which is a combination glow plug and pressure sensor 102 that is integrated with a glow plug of a diesel engine. For brevity of description, components having identical functions and basically similar configurations to corresponding components of the first embodiment are designated by identical reference numerals to those of the first embodiment. With the second embodiment, the housing 10 encloses an axially extending conductor rod 72 which is electrically connected to the heater 71 of the glow plug, for supplying electrical power to the heater 71. The heater 71 is fixedly attached to the front end of the conductor rod 72. The heater 71 and conductor rod 72 in combination constitute a central axial member 70, which functions as the pressure transmitting member of this embodiment, for transmitting the pressure within a combustion chamber to the pressure sensing element 4.

A retaining member 8 of this embodiment is fixed within the inner circumference of the rear end portion of the housing 10, for limiting the position of the central axial member 70 along the axial direction. The pressure sensing element 4 is held between a rear (tip) face of the central axial member 70 and the retaining member 8. The conductor rod 72 is connected to a heater supply lead 732, for supplying electric current to the heater 71. The output signal (pressure measurement signal) from the pressure sensing element 4 is outputted via a pressure sensor signal lead 731. In the same way as for the first embodiment, a damping body 15 envelops a part of the outer circumferential surface of the housing 10. However, unlike the first embodiment, the damping body 15 does not contact a major part of that circumferential surface.

An external screw thread section 122 of the housing 10 is screwed into a threaded plug hole in an engine block (not shown in the drawings) of the diesel engine, with the heater 71 exposed to the interior of a combustion chamber of the diesel engine.

With this embodiment the pressure in the combustion chamber, applied to the heater 71, is transmitted to the pressure sensing element 4 via the conductor rod 72. Engine vibration is transmitted through the external screw thread section 122 to the housing 10, however this vibration is attenuated by the damping body 15, before reaching the pressure sensing element 4. Hence, in the same way as for the first embodiment, combustion chamber pressure can be accurately measured, without being affected by noise resulting from vibration from the engine block.

Third Embodiment

Figure 9:
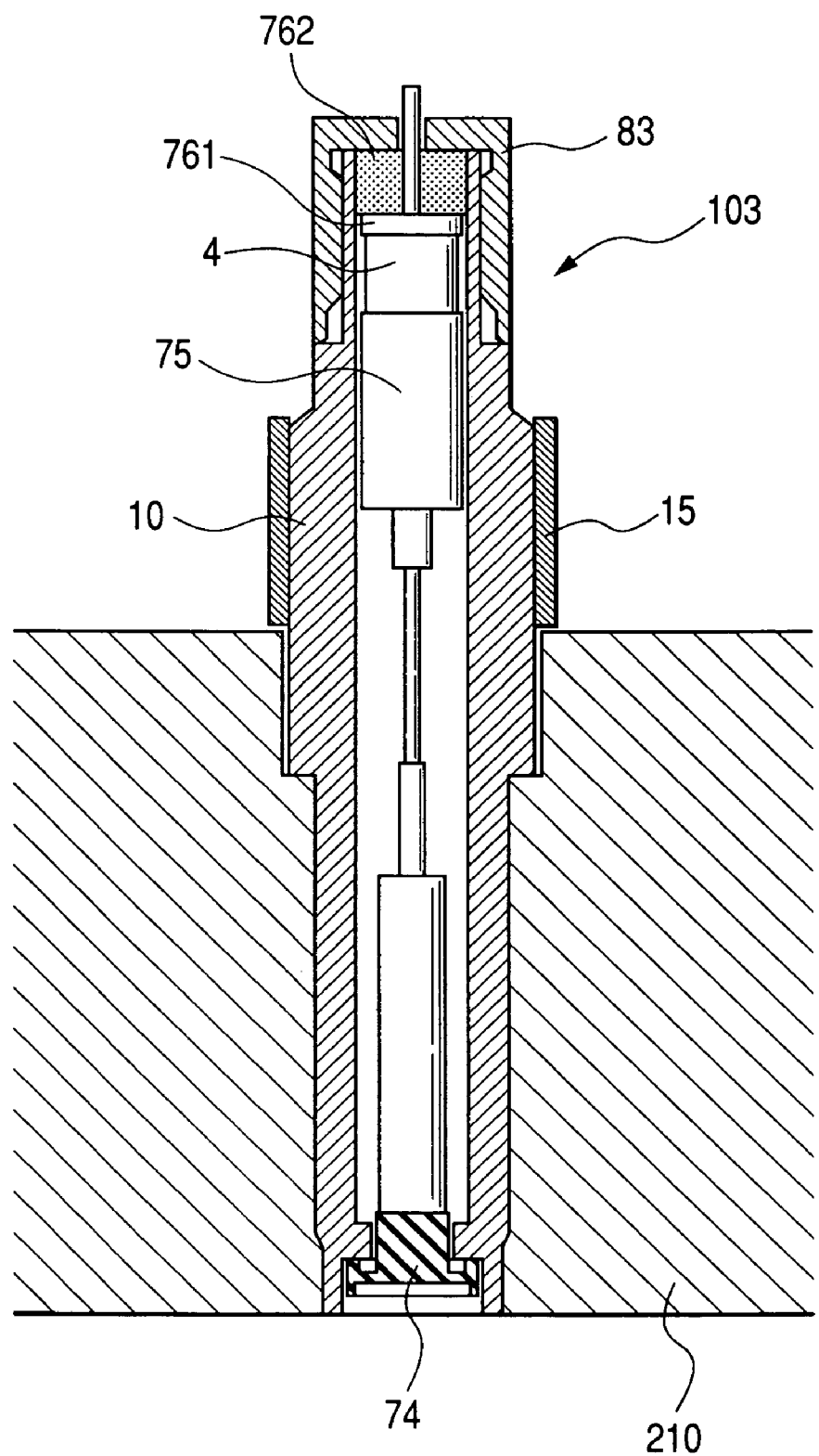
FIG. 9 is a cross-sectional view of a third embodiment of a combustion chamber pressure sensor.

A third embodiment will be described referring to FIG. 9. This is a combustion chamber pressure sensor 103 that is a dedicated pressure sensor, not integrated with other devices. The combustion chamber pressure sensor 103 includes a pressure-receptive diaphragm 74 which is located close to the tip of the front end of the housing 10, within the housing 10. The housing 10 is fixed in an engine block 210, with the pressure-receptive diaphragm 74 exposed to the interior of a combustion chamber of an internal combustion engine. An outer circumferential portion of the pressure-receptive diaphragm 74 is welded to the housing 10 (the weld not being shown in the drawings), to attach the pressure-receptive diaphragm 74 to the housing 10. The pressure-receptive diaphragm 74 is also attached to the tip of the front end of a pressure transmitting rod 75, which functions as the pressure transmitting member of this embodiment, with the end face of the rear end of the pressure transmitting rod 75 being in contact with the front face of the pressure sensing element 4. More specifically, the pressure transmitting rod 75 and the pressure-receptive diaphragm 74, in combination, constitute the pressure transmitting member in this case.

With this embodiment, the pressure sensing element 4 is of cylindrical form, having a central axis oriented along the central axis of the combustion chamber pressure sensor 103.

A retaining member 83 is disposed around the rear end of the housing 10, and a clamping member 762 and electrode plate 761 are successively disposed between the front end of the retaining member 83 and the rear face of pressure sensing element 4. The retaining member 83 presses forward against the clamping member 762 in the axial direction, so that the pressure sensing element 4 is held retained between the pressure transmitting rod 75 and the electrode plate 761 as shown in FIG. 9.

As for the first embodiment, a damping body 15 envelops a part of the outer circumferential surface of the housing 10. However unlike the first embodiment, the damping body 15 of this embodiment does not enclose a major part of that circumferential surface.

The combustion chamber pressure applied to the pressure-receptive diaphragm 74 is transmitted via the pressure transmitting rod 75 to the pressure sensing element 4. Engine vibration that is transmitted through the engine block 210 to the housing 10 is absorbed by the damping body 15, and is thereby attenuated to a sufficient degree before being transmitted to the pressure sensing element 4. The combustion chamber pressure sensor 103 can thereby measure the combustion chamber pressure without being affected by noise caused by vibration that is transmitted from the engine block 210.

With the first embodiment described above, the damping body 15 envelops substantially the entire circumferential surface of the housing 10. However as illustrated by the second and third embodiments, it is not necessarily essential that such a wide surface area be covered by (in contact with) the damping body 15. It may be possible to achieve a sufficient degree of attenuation of the vibration that is transmitted to the pressure sensing element 4 even if the damping body 15 envelopes only an axially extending minor portion of the circumferential surface of the housing 10.

Also with each of the first to third embodiments described above, a synthetic plastic material is utilized to form the damping body 15. However it would be equally possible to utilize some other type of viscoelastic material, such as cloth, rubber, lead, etc.

Figure 10:
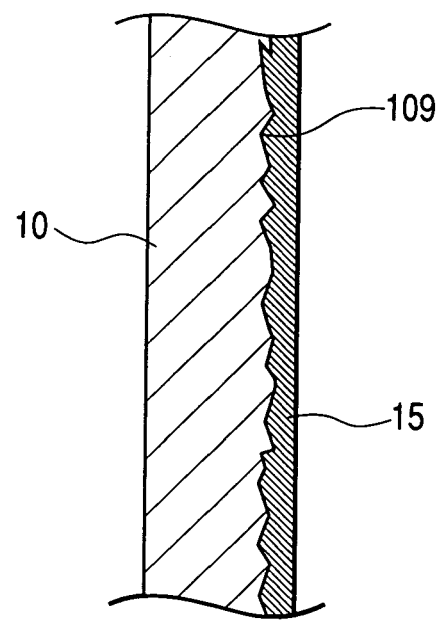
FIG. 10 is a partial cross-sectional view showing surface roughness of a housing in the third embodiment.

Furthermore with each of the first to third embodiments described above, the damping body 15 is formed as a separate member, constituted of viscoelastic material, which is attached in close contact with the circumferential surface of the housing 10. However it would be equally possible to achieve similar effects by forming a coating of damping material on that circumferential surface of the housing 10, or to wind a sheet of viscoelastic material around the housing 10. In that case, as illustrated in FIG. 10, the contact area between the housing 10 and the damping body 15 can be increased by forming the outer circumferential surface of the housing 10 as a rough surface 109. The vibration attenuation effectiveness of the damping body 15 can thereby be increased.

The ten point average roughness of the surface of the housing 10 is preferably within a range of 25 μm to 100 μm. If the roughness is within that range, then when the damping body 15 is a wrapped thin sheet of viscoelastic material, or a deposited coat of viscoelastic material, the area of contact between the surface of the housing 10 and the damping body 15 will be substantially increased, by comparison with the case in which the surface of the housing 10 is smooth.

Fourth Embodiment

Figure 11:
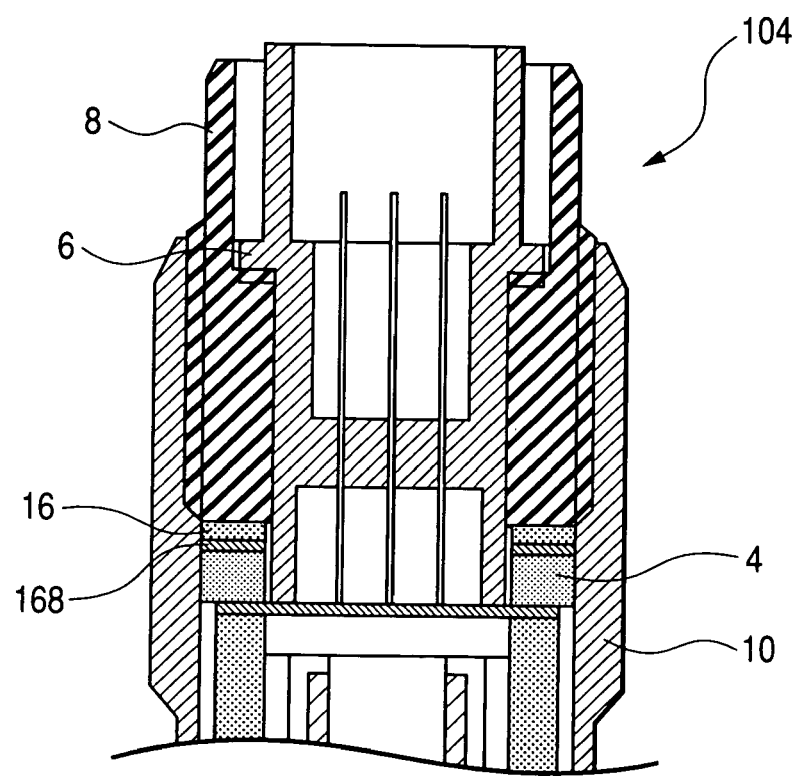
FIG. 11 is a partial cross-sectional view showing combined components of a fourth embodiment of a combustion chamber pressure sensor.

With each of the first to third embodiments described above, the damping body 15 envelops at least a part of the outer circumference surface of the housing 10. With a fourth embodiment, a damping body 16 is disposed within the housing 10, between the pressure sensing element 4 and the retaining member 8 as illustrated in the partial cross-sectional view of FIG. 11. The combination spark plug and pressure sensor 104 of this embodiment has a similar configuration to the first embodiment, i.e., being integrally combined with an ignition coil and a spark plug. The damping body 16 is formed of polyphenylene sulfide, with a flat annular shape. A ground electrode plate 168, which is also of flat annular shape, is disposed between the damping body 16 and the pressure sensing element 4, with the outer circumference of the ground electrode plate 168 being in electrical contact with the housing 10.

With this embodiment, engine vibration is transmitted to the pressure sensing element 4 along the path [housing 10]→[retaining member 8]→[damping body 16]→[ground electrode plate 168]. Due to the damping body 16 having a high degree of viscoelasticity, the vibration that affects the pressure sensing element 4 is substantially attenuated. As a result, in the same way as for the first embodiment, combustion chamber pressure can be accurately measured without being affected by noise resulting from vibration from the engine block.

Fifth Embodiment

Figure 12:
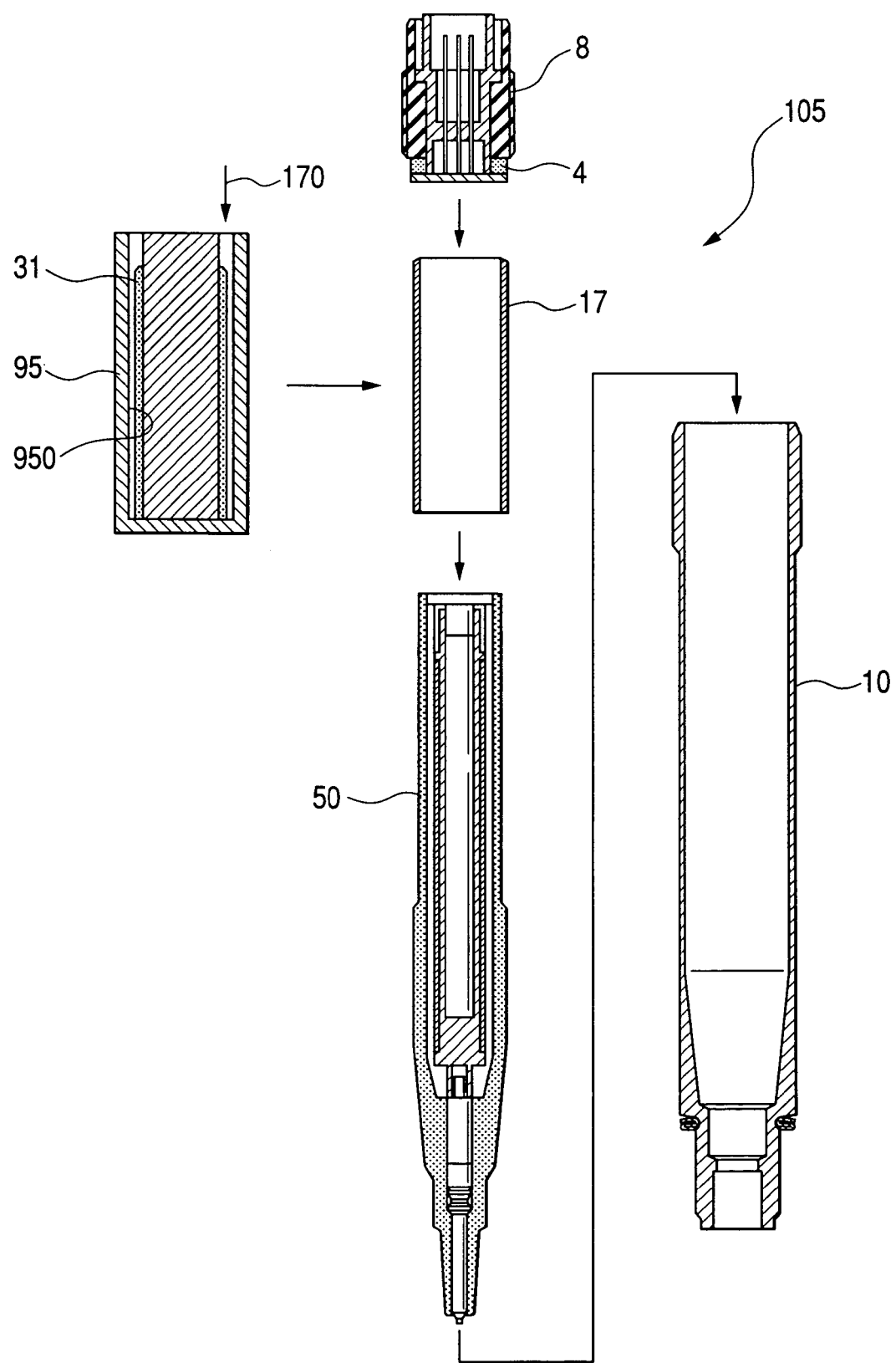
FIG. 12 is an exploded cross-sectional view for describing components of a fifth embodiment of a combustion chamber pressure sensor, which is integrated with an ignition coil and a spark plug.

A fifth embodiment will be described referring to the exploded cross-sectional view shown in FIG. 12, in which a damping body is disposed within the inner circumference of the housing 10, instead of around the outer circumference of the housing 10.

The combination spark plug and pressure sensor 105 of this embodiment has a basically similar configuration to the first embodiment shown in FIG. 1, i.e., being integrally combined with an ignition coil and a spark plug. However with the fifth embodiment, the primary coil 31 is configured to function also as the aforementioned damping body that is located within the housing 10. Specifically, in the process of manufacture (as illustrated in FIG. 12) the primary coil 31 is disposed within a cylindrical cavity formed in a mold 950, and epoxy resin 170 is injected into the mold 950. The primary coil is thereby potted in epoxy resin, with the epoxy-potted primary coil being designated by reference numeral 17 in FIG. 12. The epoxy-potted primary coil 17 is assembled into the combination spark plug and pressure sensor 105 in the same manner as for the primary coil 31 of the first embodiment, being thereby disposed around the outer circumference of the insulator 50, within the interior of the housing 10. The insulator 50 is held in place by the retaining member 8, which is screwed into the rear end of the housing 10 in the same manner as described for the first embodiment.

Since epoxy resin is a viscoelastic material, the potted primary coil 17 functions effectively as a damping body with this embodiment.

The outer diameter of the epoxy-potted primary coil 17 is made identical to, or somewhat larger than, the internal diameter of the housing 10, while the inner diameter of the epoxy-potted primary coil 17 is made larger than the outer diameter of the insulator 50. As a result, the epoxy-potted primary coil 17 is firmly held in close contact with the housing 10, with the gap between the epoxy-potted primary coil 17 and the insulator 50 being only sufficient to ensure that motion of the insulator 50 along the axial direction is unobstructed. Hence, the vibration that is transmitted by the housing 10 is effectively attenuated by the viscoelasticity of the epoxy resin of the epoxy-potted primary coil 17.

Sixth Embodiment

Figure 13:
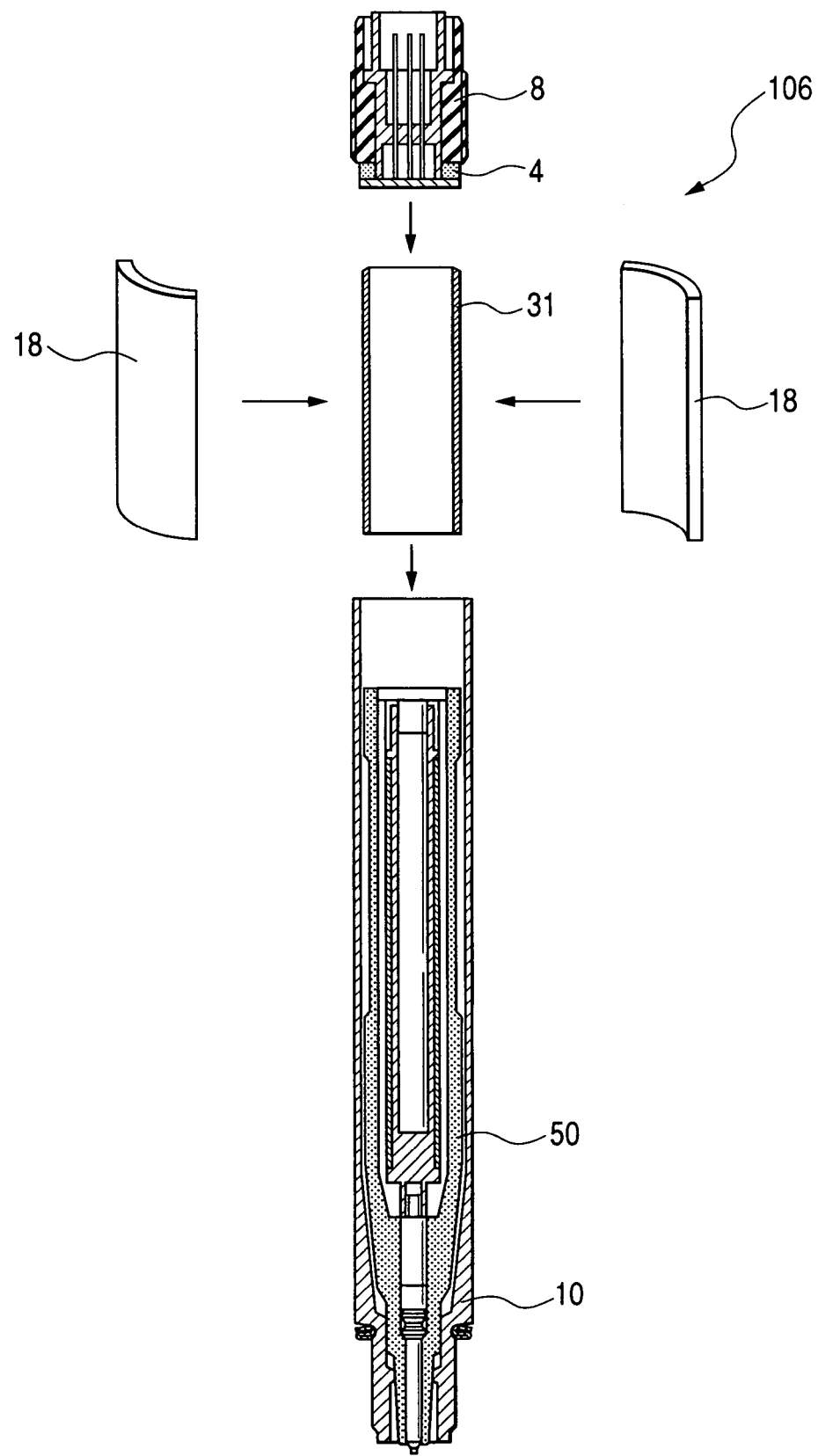
FIG. 13 is an exploded cross-sectional view for describing components of a sixth embodiment of a combustion chamber pressure sensor, which is integrated with an ignition coil and a spark plug.

A sixth embodiment will be described referring to the exploded cross-sectional view shown in FIG. 13. Here, a combination spark plug and pressure sensor 106 is integrally combined with an ignition coil and a spark plug, as for the first embodiment shown in FIG. 1, however a damping body is contained within the housing 10, as for the preceding embodiment.

With this embodiment, a sheet of polyolyphene plastic constitutes a damping body 18, which is disposed between the primary coil 31 and the housing 10, within the inner circumference of the housing 10. The thickness of the damping body 18 is made slightly greater than the gap between the inner circumference of the housing 10 and the primary coil 31. In the manufacturing process, all of the components other than the housing 10 and the rear end components (made up of the pressure sensing element 4, retaining member 8, etc., shown in the upper part of FIG. 13) are first assembled, then that assembly is inserted through the rear end of the housing 10, with force being applied to the damping body 18 in the radially inward direction as it is being inserted the housing 10, to thereby permit the damping body 18 to enter the housing 10.

As an alternative to the methods of disposing a damping body at the inner circumference of the housing 10 with the fifth and sixth embodiments described above, it would be possible to deposit a layer of viscoelastic material on the inner circumferential surface of the housing 10 by spray-painting.

Moreover it would be equally possible to provide damper bodies both at the outer circumference of the housing 10 (as for the first to fourth embodiments described above) and also within the inner circumference of the housing 10 (as for the fifth and sixth embodiments described above). This could for example be achieved by immersing a part of the housing 10 in a viscoelastic material that is in liquid form.

Seventh Embodiment

Figure 14:
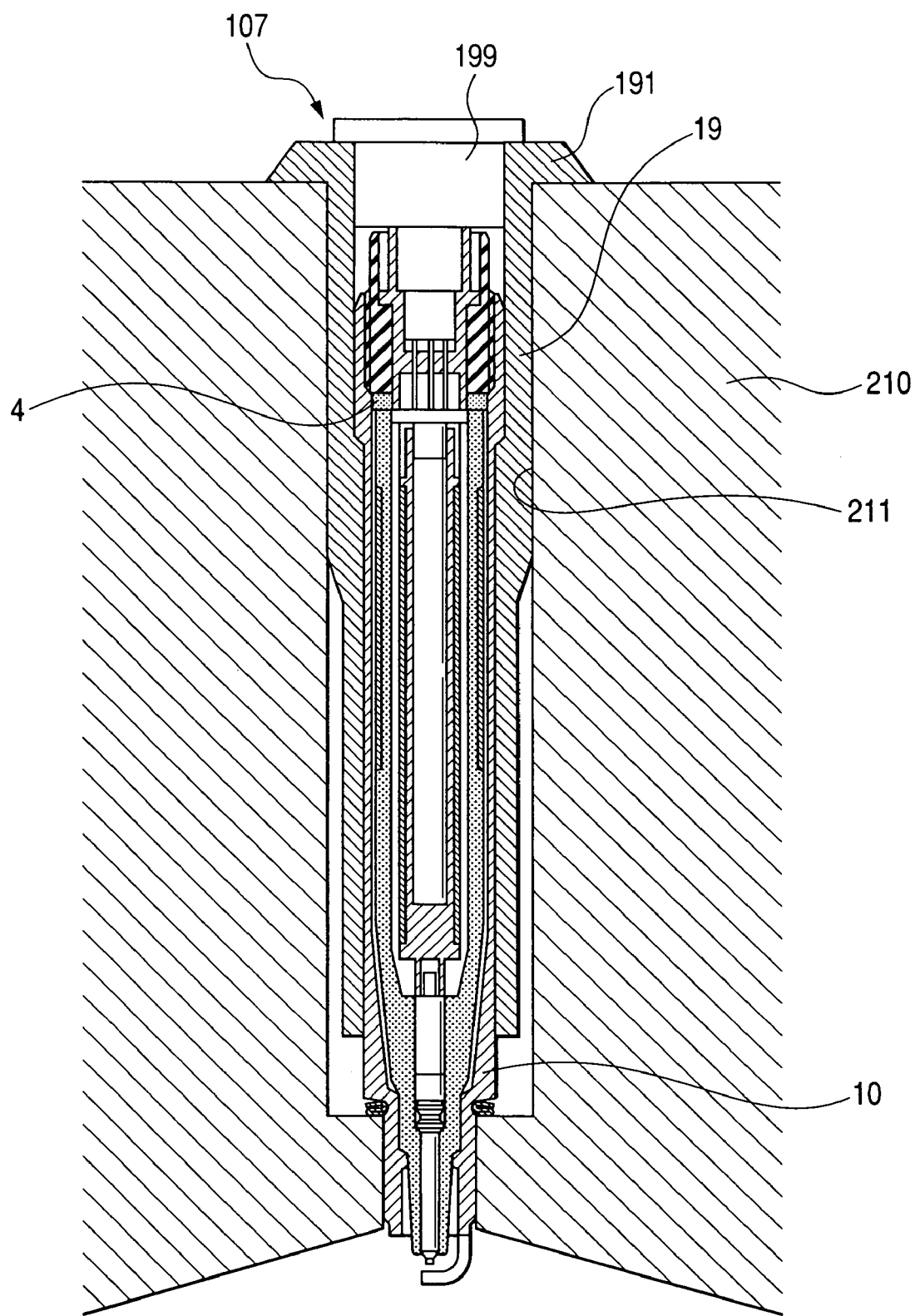
FIG. 14 is a cross-sectional view of a seventh embodiment of a combustion chamber pressure sensor, which is integrated with an ignition coil and a spark plug.

A seventh embodiment will be described referring to the cross-sectional view shown in FIG. 14, in which a combination spark plug and pressure sensor 107 is integrally combined with an ignition coil and a spark plug, as for the first embodiment.

With this embodiment, a plug hole 211 of appropriate diameter is formed beforehand in the engine block 210, and a damping body 19 is disposed in a gap between the outer circumference of the housing 10 of the combination spark plug and pressure sensor 107 and inner circumference of the plug hole 211, to hermetically seal the gap.

The damping body 19 is of tubular shape, and is formed of silicon rubber. The inner circumferential surface of the damping body 19 is configured to establish close contact with the outer circumferential surface of the housing 10, and similarly, the outer circumferential surface of the damping body 19 is configured to establish close contact with the inner circumferential surface of the plug hole 211. In addition, the rear end of the damping body 19 is formed with a flange 191 as shown, which is configured to fit closely against the surface of the engine block 210.

A connector 199 is disposed within the inner circumference of the rear end of the damping body 19. The connector 199 incorporates terminals which convey the engine ignition signal, and the pressure detection signal that is produced by the pressure sensing element 4, with the rear end of the damping body 19 being hermetically sealed by the connector 199.

Since silicon rubber is a viscoelastic material, the damping body 19 serves to attenuate the vibration that is transmitted from the engine block 210, and thereby prevents resultant noise from occurring in the pressure detection signal from the pressure sensing element 4. Furthermore since the damping body 19 supports the upper part of the ignition coil, it serves to prevent damage to the ignition coil caused by vibration, even when the ignition coil is of thin elongated form.

In addition, the damping body 19 in conjunction with the connector 199 serves to seal the plug hole 211, and so prevent the entry of water or other extraneous material.

Eighth Embodiment

Figure 15:
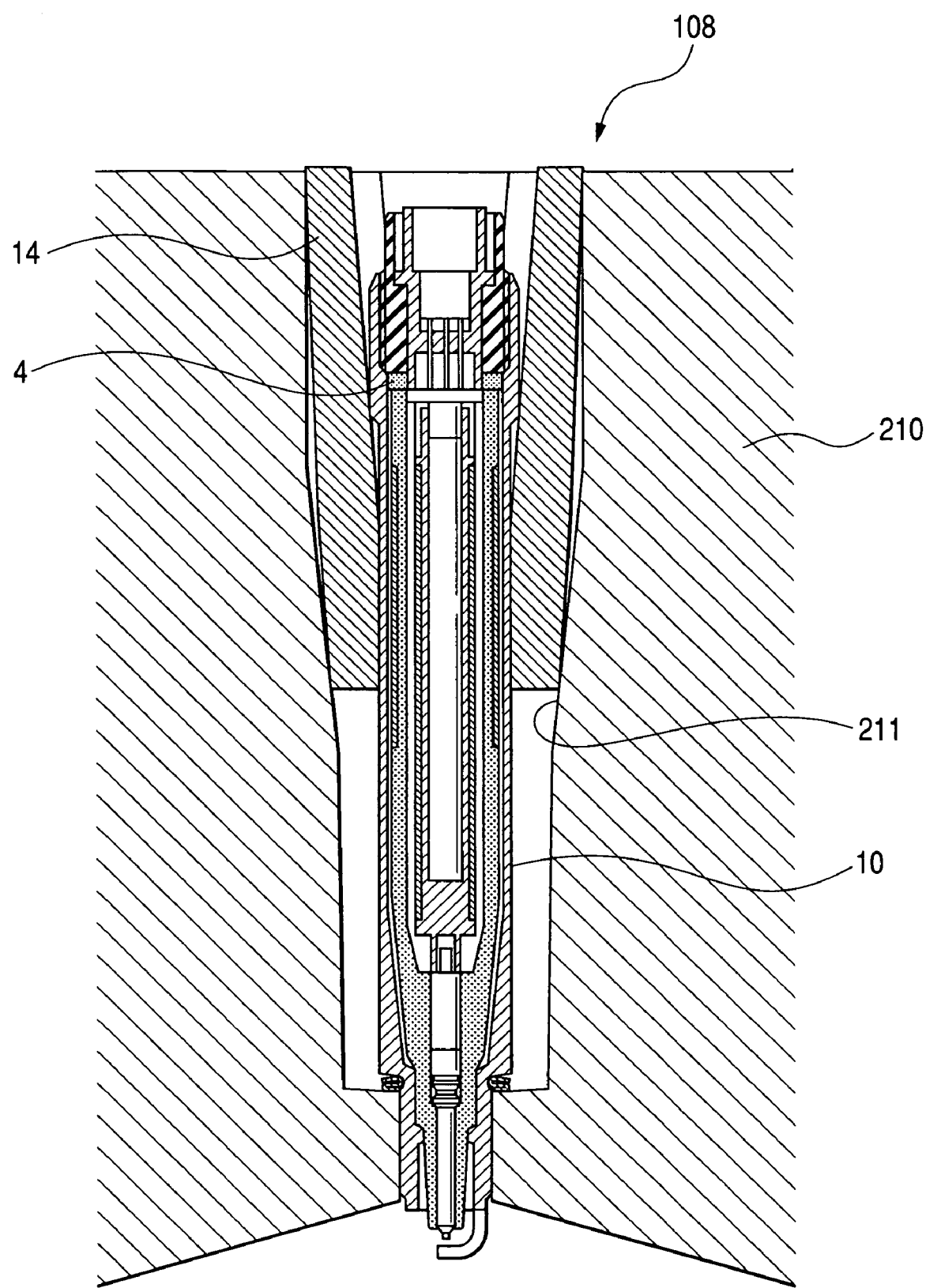
FIG. 15 is a cross-sectional view of an eighth embodiment of a combustion chamber pressure sensor, which is integrated with an ignition coil and a spark plug.

An eighth embodiment will be described referring to the cross-sectional view shown in FIG. 15, in which a combination spark plug and pressure sensor 108 is integrally combined with an ignition coil and a spark plug, as for the first embodiment.

With this embodiment, as for the preceding embodiment, an external tubular member that extends to the outer surface of the engine block 210 serves as a damping body 14, and also serves to seal the gap between the housing 10 of the combination spark plug and pressure sensor 108 and the plug hole 211 that is formed in the engine block 210. The damping body 14 of this embodiment is formed as a tube which tapers from the rear end to the front end (i.e., from top to bottom as seen in FIG. 15). When installing the combination spark plug and pressure sensor 108 in the engine block 210, after the combination spark plug and pressure sensor 108 (other than the damping body 14) has been attached to the engine block by being screwed into the threaded portion of the plug hole 211 as described for the first embodiment, the damping body 14 is pushed into the gap between the housing 10 and the circumferential surface of the plug hole 211, to become wedged between that surface and the housing 10 as illustrated in FIG. 15.

The effects obtained with this embodiment are similar to those described above for the seventh embodiment.

With each of the above embodiments, the damping body is formed of a viscoelastic material that has a larger modulus of viscosity and a smaller modulus of elasticity than the material which constitutes the housing of the combustion chamber pressure sensor, to ensure effective vibration attenuation. Preferably, the modulus of viscosity of the damping body is preferably at least $10^2$ PaS, and the modulus of elasticity of the damping body is no greater than $3 \times 10^{10}$ N/m². If the modulus of viscosity of the damping body is less than $10^2$ PaS, then the extent of absorption of the vibration by the damping body may be insufficient, while if the modulus of elasticity exceeds $3 \times 10^{10}$ N/m² then the damping body may not effectively suppress vibration that occurs at frequencies of less than 6 kHz.

Preferably, the damping body is formed from a synthetic plastic material such as polyphenylene sulfide, phenol, epoxy, alkyd, or polyester, or from silicon rubber or fluorine rubber. Each of these materials are viscoelastic, i.e., having both viscosity and elasticity. Such a material is readily deformed by an applied force, only gradually recovering its original shape after the applied force is removed, and so ensures effective damping of vibration.

Ninth Embodiment

Figure 16:
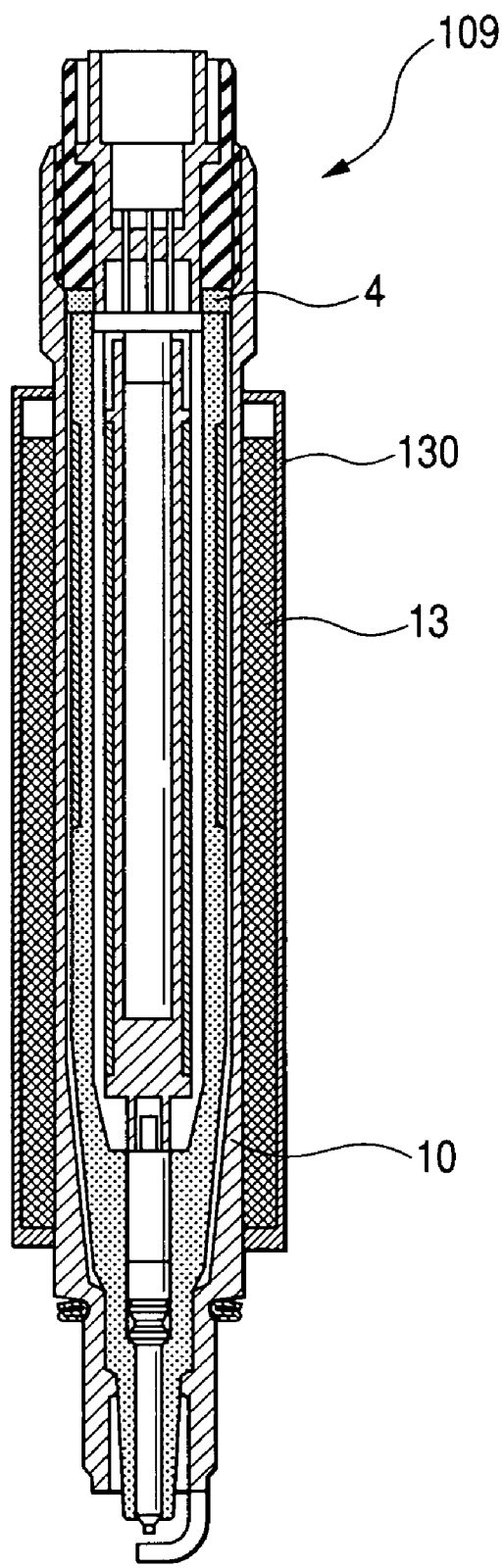
FIG. 16 is a cross-sectional view of a ninth embodiment of a combustion chamber pressure sensor, which is integrated with an ignition coil and a spark plug.

A ninth embodiment will be described referring to the cross-sectional view shown in FIG. 16, in which a combination spark plug and pressure sensor 109 is integrally combined with an ignition coil and a spark plug, as for the first embodiment.

With this embodiment, a liquid having a high degree of viscosity is utilized as a damping body 13. Specifically, the housing 10 of this embodiment is formed to include an external circumferentially extending closed chamber, of tubular shape, which functions as a damper housing 130. Prior to completely sealing the damper housing 130 at the time of manufacture, it is filled with a liquid which has high viscosity, and which functions as a damping body, designated by numeral 13 in FIG. 16. With this embodiment, the vibration that is transmitted to the housing 10 is effectively attenuated by being absorbed by the damping body 13.

The viscosity of the liquid constituting the damping body 13 should be least $10^{-3}$ PaS. However from considerations of ease of filling the enclosed chamber with the viscous liquid, the viscosity should be no greater than 4 PaS. Preferably, the liquid is silicon oil.

Figure 17:
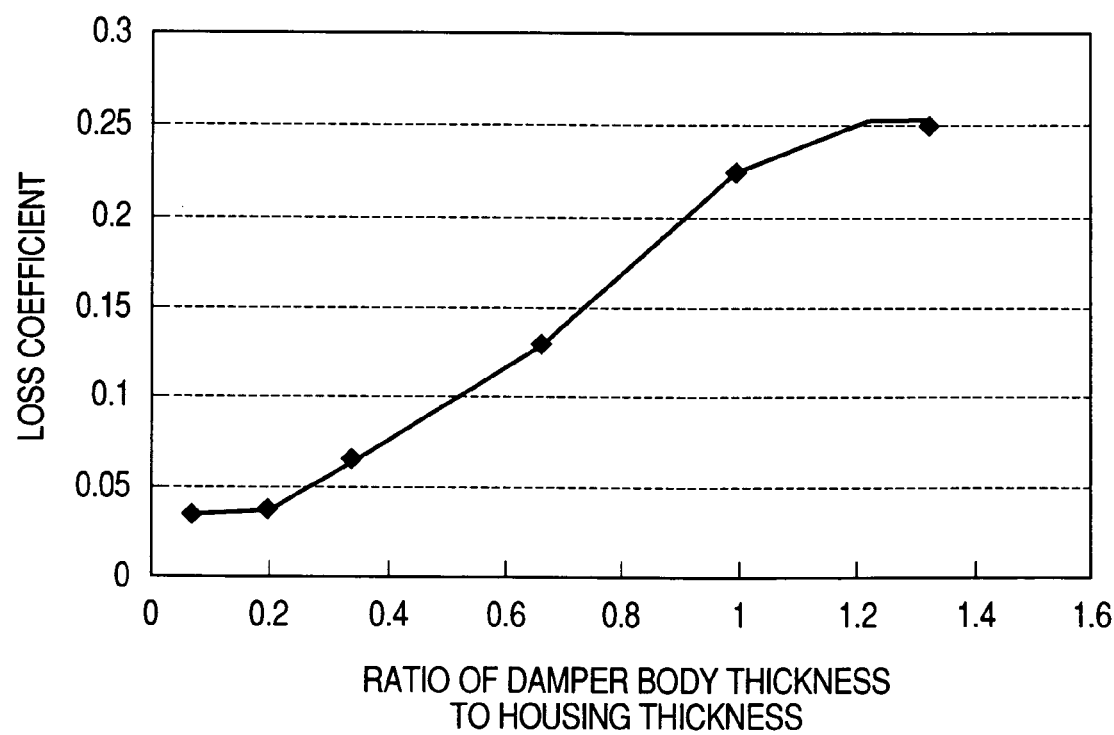
FIG. 17 is a graph showing the relationship between a degree of vibration noise attenuation (expressed as a loss coefficient) and the ratio of respective thicknesses of a damping body and a housing of a combustion chamber pressure sensor.

When the damping body is a solid body formed of a viscoelastic material, the greater the thickness of the damping body, the greater will become the effectiveness of the noise attenuation. However disadvantages result if the damping body is made excessively thick, for example, the outer diameter of the sensor may become excessively large. This can result in problems in installing such a pressure sensor device in an internal combustion engine. For that reason, tests were performed to determine the relationship between the damping body thickness and noise attenuation effectiveness (expressed as a value of loss coefficient). The test results obtained are shown in the graph of FIG. 17. In FIG. 17, values of the ratio of the damping body thickness (referring to FIG. 1, as measured along a radial direction from the external circumference of the housing 10) to the thickness of the housing 10 (more specifically, the wall thickness of the part of the housing 10 that is in contact with the damping body) are plotted along the horizontal axis, while values of loss coefficient are plotted along the vertical axis, with increasing magnitude of loss coefficient corresponding to an increasing degree of noise attenuation. The device configuration used in obtaining the test results was similar to that of the first embodiment, with the damping body being formed of polyolyphene plastic as for the first embodiment. Substantially identical results were obtained for the other embodiments (apart from the ninth embodiment of FIG. 16, in which the damping body is a viscous liquid).

As can be understood from FIG. 17, if the ratio of the damping body thickness to the housing thickness is less than approximately 0.3, the loss coefficient is substantially identical to that for the case in which no damping body is provided. As the ratio of damping body thickness to housing thickness is increased above 0.3, the loss coefficient increases accordingly, but ceases to increase significantly as the ratio of damping body thickness to housing thickness is increased beyond approximately 1.2.

Hence, for optimum noise attenuation, the ratio of damping body thickness to housing thickness is preferably within a range from 0.3 to 1.2.

It should be understood that the invention is not limited to the specific embodiments described above, and that various modifications to these embodiments, or combinations of respective features of the embodiments, could be envisaged, that fall within the scope claimed for the invention in the appended claims. For example as described above, it would be possible to dispose damping bodies (i.e., discrete members formed of a viscoelastic material, or deposited layers of a viscoelastic material) on both internal and external circumferential surfaces of the housing of the combustion chamber pressure sensor. Alternatively, it would for example be possible to incorporate the internal annular damping body 16 of the fourth embodiment in addition to a damping body that is disposed on a circumferential surface of the housing.

It should be noted that in the appended claims, the terms "front" and "rear" are used with the significances defined hereinabove for referring to relative positions of components of a combustion chamber pressure sensor.

What is claimed is:

1. A combustion chamber pressure sensor for measuring pressure within a combustion chamber that is enclosed in an engine block of an internal combustion engine, comprising a housing that is attached in said engine block with a front end of said housing being open to an interior of said combustion chamber, a pressure sensing element that is retained within said housing, a pressure transmitting member that is a solid body retained within said housing with a front end of said pressure transmitting member being located in said front end of said housing and exposed to said interior of said combustion chamber and with a rear end of said pressure transmitting member being in contact with said pressure sensing element;

wherein said combustion chamber pressure sensor comprises a damping body disposed separately from and spaced from said pressure transmitting member and from said pressure sensing element and in contact with a circumferential surface of said housing, said circumferential surface extending an axial direction of said housing, in parallel to an axis of said housing, for attenuating vibration that is transmitted to said housing from said engine block.

2. A combustion chamber pressure sensor according to claim 1, wherein said damping body is disposed in contact with at least one of an external circumferential surface of said housing and an internal circumferential surface of said housing.

3. A combustion chamber pressure sensor according to claim 1, wherein said damping body is formed of a viscoelastic material having a larger modulus of viscosity than a material which constitutes said housing and having a smaller modulus of elasticity than said material which constitutes said housing.

4. A combustion chamber pressure sensor according to claim 3, wherein said modulus of viscosity of said damping body is at least $10^2$ PaS, and wherein said modulus of elasticity of said damping body is no greater than $3\times10^{10}$ N/m$^2$.

5. A combustion chamber pressure sensor according to claim 4, wherein said damping body is formed from one of a group of synthetic plastic materials which include polyphenylene sulfide, phenol, epoxy, alkyd, and polyester.

6. A combustion chamber pressure sensor according to claim 4, wherein said damping body is formed from silicon rubber or fluorine rubber.

7. A combustion chamber pressure sensor according to claim 1, wherein a ratio of a thickness of said damping body to a thickness of a wall of said housing is within a range from 0.3 to 1.2.

8. A combustion chamber pressure sensor according to claim 1, wherein said housing incorporates an enclosed chamber and said chamber is filled with a viscous liquid, with said liquid constituting said damping body.

9. A combustion chamber pressure sensor according to claim 8, wherein said liquid is silicon oil.

10. A combustion chamber pressure sensor according to claim 1, said housing being formed of an electrically conductive material and having a retaining member attached to a rear end of said housing; wherein said damping body is disposed internally within said housing, and said combustion chamber pressure sensor comprises a ground electrode plate disposed internally within said housing and electrically coupled to said housing; and wherein a front face of said ground electrode plate is disposed in contact with a rear face of said and wherein a front face of said ground electrode plate is disposed in contact with a rear face of said pressure sensing element, a rear face of said ground electrode plate is disposed in contact with a front face of said damping body, and a rear face of said damping body is disposed in contact with a front face of said retaining member.

11. A combustion chamber pressure sensor according to claim 10, wherein said ground electrode plate is of annular form, said damping body and said pressure sensing element comprise respective annular members, and wherein respective annular faces of said damping body, said pressure sensing element and said ground electrode plate are substantially identical to one another.

12. A combustion chamber pressure sensor according to claim 1, said combustion chamber pressure sensor being integrally formed in a device that is a combination of an ignition coil, spark plug and pressure sensor, said device comprising a primary coil and a secondary coil of said ignition coil, a central electrode, a ground electrode of said spark plug, and an insulator that is of elongated form and encloses said secondary coil and said central electrode and is circumferentially enclosed by said primary coil, said primary coil being sheathed within said housing and said ground electrode being fixedly attached to said front end of said housing, with a front end of said insulator disposed adjacent to said ground electrode, exposed to said interior of said combustion chamber; wherein a rear end of said insulator is disposed in contact with said pressure sensing element, and said pressure transmitting member is constituted by said insulator.

13. A combustion chamber pressure sensor according to claim 1, wherein said combustion chamber pressure sensor is integrally formed in a device that is a combination of a glow plug and pressure sensor, said device comprising a heater and an axially centrally disposed conductor element for supplying electrical power to said heater, said conductor element being of elongated form and retained within said housing, and said heater being fixedly attached to a front end of said conductor element, exposed to said interior of said combustion chamber; wherein a rear end of said conductor element is disposed in contact with said pressure sensing element, and said pressure transmitting member is constituted by said heater element and said conductor element, in combination.

14. A combustion chamber pressure sensor according to claim 1, wherein said damping body comprises a layer of viscoelastic material formed upon at least one of said outer circumferential surface and inner circumferential surface of said housing by a deposition process.

15. A combustion chamber pressure sensor according to claim 14, wherein said at least one of said outer circumferential surface and inner circumferential surface of said housing has a predetermined degree of surface roughness.

16. A combustion chamber pressure sensor according to claim 1, wherein said damping body comprises a sheet of viscoelastic material that is wound over said outer circumferential surface of said housing.

17. A combustion chamber pressure sensor according to claim 16, wherein said outer circumferential surface of said housing has a predetermined degree of surface roughness.

18. A combustion chamber pressure sensor according to claim 12, wherein said damping body comprises a tubular member formed by molding said primary coil of said ignition coil in a synthetic resin material, and wherein said tubular member is disposed with an outer circumferential surface thereof in contact with said inner circumferential surface of said housing and with an inner circumferential surface of said tubular member spaced apart from an outer circumferential surface of said insulator by a gap of predetermined size.

* * * * *